(12) United States Patent
Masello

(10) Patent No.: US 6,446,388 B2
(45) Date of Patent: Sep. 10, 2002

(54) CONTAINER WITH DIFFUSE EXTENDED IRRIGATION FOR CULTIVATING PLANTS

(75) Inventor: Giovanni Franco Masello, San Vito di Leguzzano (IT)

(73) Assignee: Deroma S.p.A., Malo (IT)

(*) Notice: Subject to any disclaimer, the term of this patent is extended or adjusted under 35 U.S.C. 154(b) by 0 days.

(21) Appl. No.: 09/912,175

(22) Filed: Jul. 24, 2001

(30) Foreign Application Priority Data

Jul. 28, 2000 (IT) .................................. VI2000A000165

(51) Int. Cl.⁷ .................................................. C10J 3/68
(52) U.S. Cl. ............................................................ 47/80
(58) Field of Search ............................ 47/79, 80, 65.7, 47/65.5

(56) References Cited

U.S. PATENT DOCUMENTS

| | | | | |
|---|---|---|---|---|
| 3,739,524 A | * | 6/1973 | Rose | 116/228 |
| 4,344,251 A | * | 8/1982 | Edling | 47/80 |
| 4,356,665 A | * | 11/1982 | de Oliveira | 47/80 |
| 4,745,707 A | * | 5/1988 | Newby | 47/32.7 |
| 4,999,947 A | * | 3/1991 | Whitaker | 47/81 |
| 5,099,609 A | * | 3/1992 | Yamauchi | 47/79 |
| 5,189,835 A | * | 3/1993 | Green | 47/80 |
| 5,247,762 A | * | 9/1993 | Green | 47/79 |
| 6,038,814 A | * | 3/2000 | Miotto | 47/79 |

* cited by examiner

Primary Examiner—Charles T. Jordan
Assistant Examiner—Kevin Jakel
(74) Attorney, Agent, or Firm—R. Neil Sudol; Henry Coleman

(57) ABSTRACT

A container with diffuse and extended irrigation for cultivating plants, which includes porous regions in the containment walls, which are arranged in contact with the soil of a plant, and a water reserve for supplying the porous regions. The container further includes a waterproofing layer for covering the porous regions, in their parts that are not in contact, for preventing the water from being lost by evaporation from the porous regions toward the outside of the container. The invention solves the problems of conventional containers, providing the soil with the right amount of moisture in an extremely simple manner for several days, accordingly avoiding periodic watering.

18 Claims, 2 Drawing Sheets

CONTAINER WITH DIFFUSE EXTENDED IRRIGATION FOR CULTIVATING PLANTS

BACKGROUND OF THE INVENTION

1. Field of the Invention

The present invention relates to a container with diffuse extended irrigation for cultivating plants, particularly but not exclusively useful for ornamental indoor plants.

2. Description of the Prior Art

So-called water-storage containers, which allow to maintain the correct moisture of the soil for several days and therefore to prevent periodic watering, are already known. Those containers are therefore particularly appreciated by people who cannot, for various reasons, periodically water their plants for short and medium periods. The structure of those containers consists of a vase, which is substantially frustum-shaped but can also be squared, and is made of molded plastics, and of a grille-like partition which is arranged at the bottom of the containers and divides the internal region of the vase into two superimposed chambers. Accordingly, the upper chamber accommodates the soil in which the plant is bedded, while the water reserve is constituted in the lower chamber and is introduced either through an adapted hole, located at the partition, or from above by simple watering. Through wicks or tubes provided at the containment walls, the water drawn from the reserve flows over the soil and is thus distributed uniformly inside it.

A problem of these containers is that the water introduced in the reserve tends to stagnate and rises with difficulty along the tubes into the soil. Accordingly, it is not ensured that the plant receives extended and diffuse irrigation over short and medium periods.

Another drawback is that the water-reserve system can be applied practically exclusively to plastic vases, because in the case of earthenware containers or vases the water contained in the reserve tends to evaporate through the containment walls and the bottom.

SUMMARY OF THE INVENTION

The aim of the present invention is to overcome the drawbacks of the cited prior art by providing a container with diffuse and extended irrigation for cultivating plants which allows to extend the water-storage system also to earthenware vases.

An object of the invention is to provide a container in which the water contained in the reserve does not stagnate but becomes a source of diffuse and extended irrigation for the plant.

A further object of the invention is to provide a container at lower production costs than prior art containers.

A further object of the invention is to provide a container which can be made with any shape and provided with any kind of decoration along its outer lateral surface.

This aim, these objects and others which will become better apparent hereinafter are achieved by a container with diffuse and extended irrigation for cultivating plants as claimed in the appended claims.

BRIEF DESCRIPTION OF THE DRAWINGS

Further characteristics and advantages of the invention will become better apparent from the description of a preferred but not exclusive embodiment thereof, illustrated only by way of non-limitative example in the two accompanying drawings, wherein.

DESCRIPTION OF THE PREFERRED EMBODIMENTS OF THE INVENTION

Figure 1:
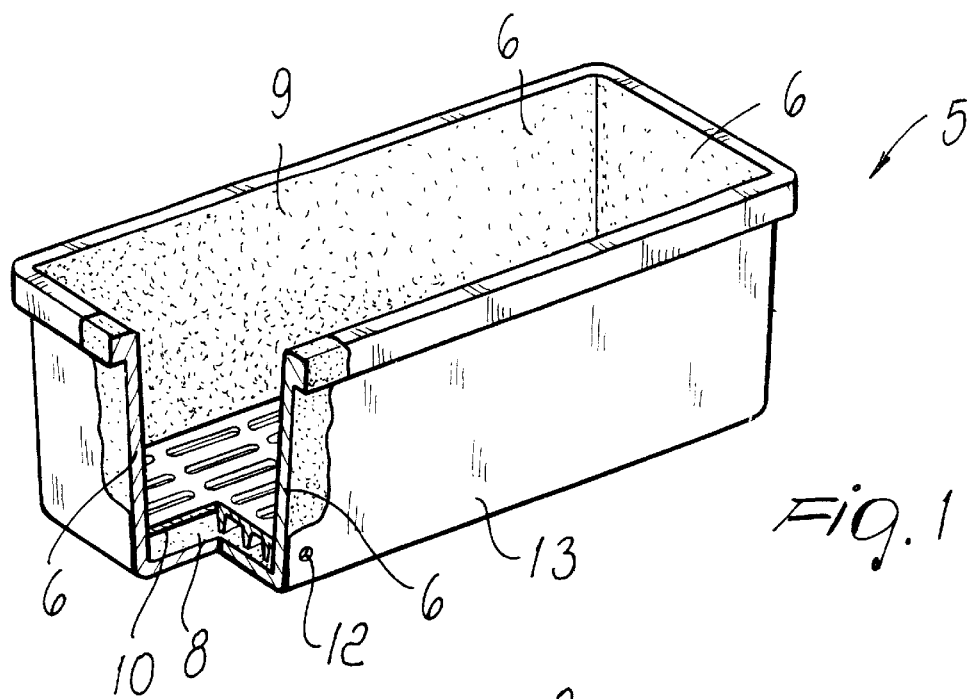
FIG. 1 is a partially sectional perspective view of a squared container according to the invention.
Figure 2:
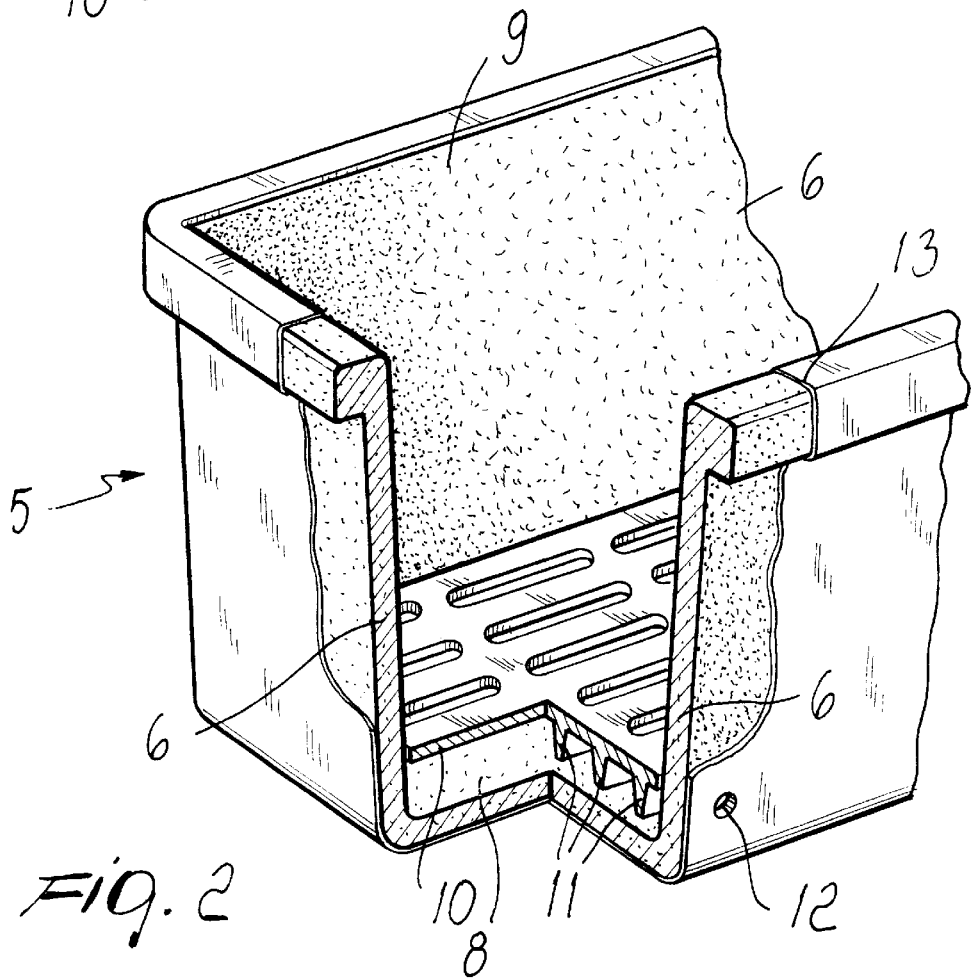
FIG. 2 is an enlarged-scale perspective view of a portion of the container of FIG. 1.
Figure 3:
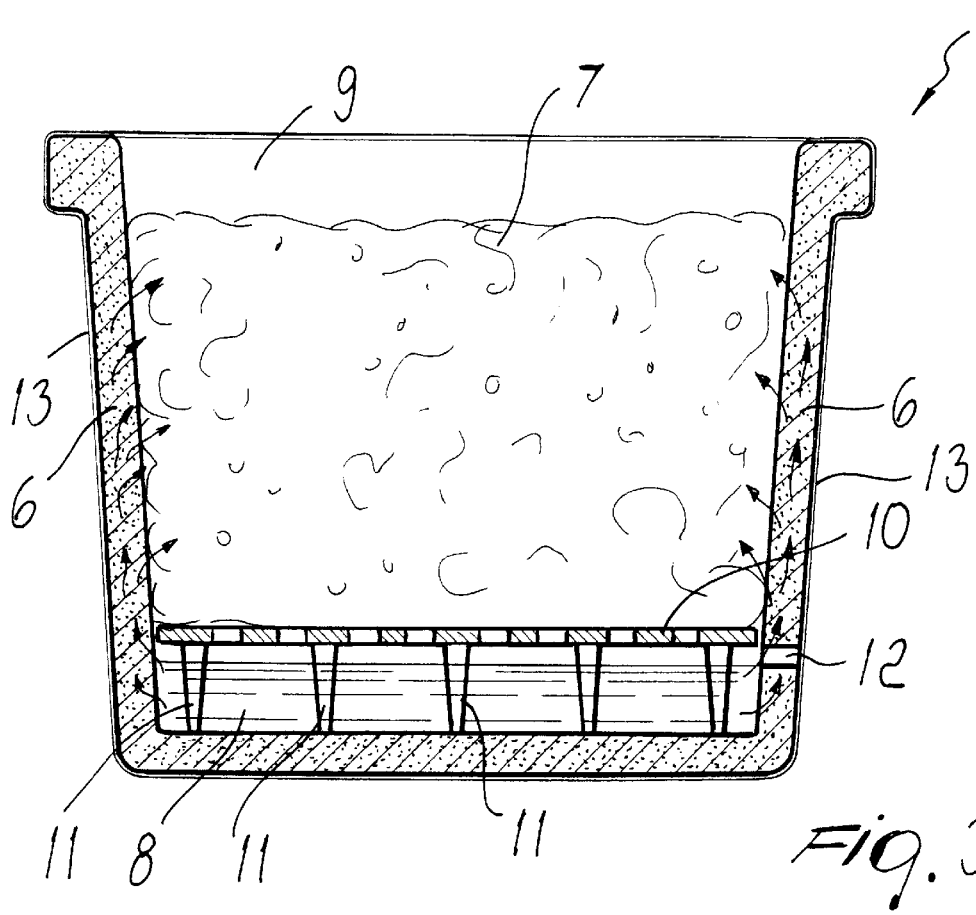
FIG. 3 is a sectional view of the container of FIG. 1, taken along a plane which is perpendicular to the extension of the container.
Figure 4:
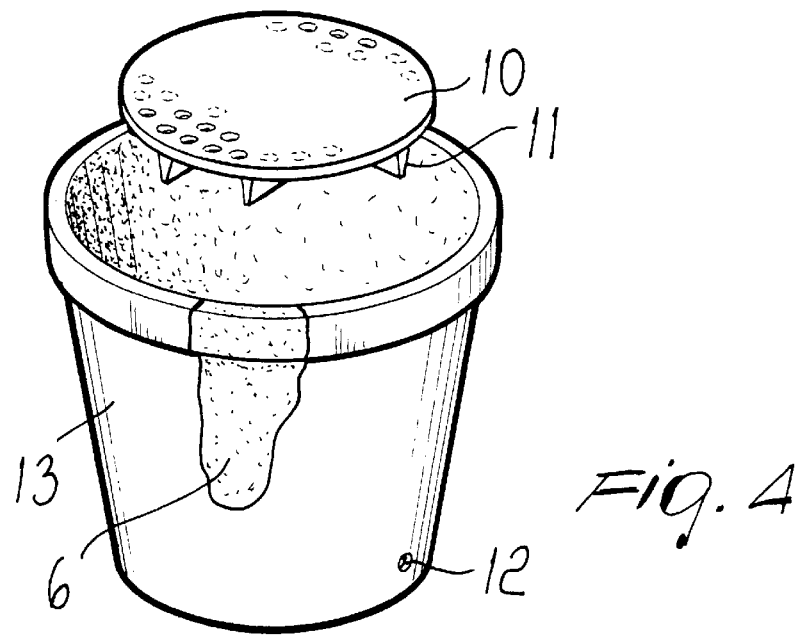
FIG. 4 is an exploded view of an approximately frustum-shaped container.

With reference to the accompanying figures, the container with diffuse and extended irrigation for cultivating plants, generally designated by the reference numeral 5, comprises porous regions 6 formed in the lateral containment walls and placed in contact with the soil 7 in which the plant is bedded. In the specific case of FIGS. 1 to 3, the porous regions 6 are made of earthenware and coincide with the lateral containment walls and with the bottom of the squared container. In the specific case of FIG. 4, the porous regions are again made of earthenware and coincide with the lateral containment wall and with the bottom. The container 5 also has a water reserve formed in a per se known manner. The internal region formed by the structure 5 is in fact divided into two superimposed chambers 8 and 9 by a removable grille-like partition 10, which is provided with a plurality of feet 11 for resting on the bottom of the container. The chamber 9 is thus adapted to accommodate the soil 7, while the chamber 8 is adapted to contain the water reserve, which is introduced in the container 5 through a hole 12 formed in one of the containment walls, approximately at the height of the partition 10. If the hole 12 is not provided, the water may be introduced from above by simple watering, penetrating the soil 7. The grille-like partition 10 can of course be arranged at different distances from the bottom of the container 5 according to the height of the feet 11, depending on the capacity of the water reserve to be provided. The water reserve is adapted to feed extendedly the porous regions 6. In the specific case, the water contained in the reserve rises by capillary action along the containment walls of the container 5, occupying its interstices formed by the pores in a uniformly distributed manner. A particularity of the invention is that the container comprises a waterproofing layer 13 that covers the porous regions 6, in their parts that are not in contact. The layer prevents the water from being lost through evaporation from the porous regions toward the environment outside the container. In the specific case, the waterproofing layer 13 consists of a covering which covers the entire outer lateral surface of the containment walls and of the bottom of the container 5. In particular, the layer 13 can be provided by means of a waterproofing process obtained by immersion or by spreading for example with a brush. The function of the layer is to force the water that has risen by capillary action, and is uniformly distributed in the walls, to wet the soil 7 extendedly and in a uniformly diffuse manner, without evaporating toward the outside environment that surrounds the container, contrary to what occurs with conventional earthenware vases. In this manner one obtains a diffuse and extended irrigation of the soil 7 for several days without having to introduce fresh water in the reserve or perform periodic watering.

In practice it has been observed that the described container achieves the intended aim and objects, since it allows to keep the soil moist in a uniformly distributed manner for several days without having to perform successive watering operations or introduce water in the reserve. Moreover, the covering is provided and preset in an extremely simplified manner. Finally, the application of the covering adapts to any shape of the container and also to the presence of relief decorations formed on the outer lateral surface of the containment walls of the container.

The container according to the invention is susceptible of numerous modifications and variations, all of which are within the scope of the same inventive concept expressed herein.

All the details may also be replaced with other technically equivalent elements.

In practice, the materials used, as well as the contingent shapes and dimensions, may be any according to requirements.

What is claimed is:

1. A container with diffuse and extended irrigation for cultivating plants, comprising porous regions in the containment walls, said porous regions being arranged in contact with the soil, and at least one water reserve for supplying said porous regions, comprising at least one waterproofing layer for covering said porous regions in their parts that are not in contact, said layer preventing that water from being lost by evaporations from said porous regions towards the outside of said container, wherein the water contained in said reserve rises up within the porous regions of said containment walls by capillary action and is released to said soil, so that said water released by said walls towards the inside of said container keeps the soil moist for several days, avoiding the need to introduce fresh water in said reserve or perform periodic watering.

2. The container according to claim 1, comprising containment walls which coincide with said porous regions.

3. The container according to claim 1, comprising a removable grille-like partition which divides the internal region, delimited by said containment walls and by the bottom, into two superimposed chambers, one chamber accommodating said soil, the other chamber containing said water reserve, said partition being provided on a lower side with a plurality of feet all spaced from all of said containment walls.

4. The container according to claim 1, wherein said waterproofing covering layer is a unitary, integral and continuous layer completely covering the outer lateral surfaces of said containment walls and the outer surface of said bottom.

5. The container according to claim 1, wherein said containment walls and said bottom are made of earthenware.

6. The container according to claim 1, wherein said waterproofing covering layer is applied by means of a procedure for waterproofing by immersion or spreading.

7. A container with diffuse and extended irrigation for cultivating plants, comprising:
a plurality of containment walls and a bottom, said containment walls including first porous regions on inwardly facing sides disposable in contact with soil in the container, said bottom including a second porous region on an upwardly facing side disposable in contact with soil in the container;
at least one water reserve for supplying said first porous regions; and
at least one waterproofing layer covering outer sides of said first porous regions and an outer side of said second porous region.

8. The container according to claim 7 wherein said second porous region is integral and continuous with said first porous regions.

9. The container according to claim 7 wherein said first porous regions are coextensive with said containment walls and wherein said second porous region is coextensive with said bottom.

10. The container according to claim 7, comprising a removable grille-like partition which divides, into two superimposed chambers, an internal region defined by said containment walls and by said bottom, one of said chambers accommodating said soil, the other of said chambers containing said water reserve.

11. The container according to claim 7, wherein the water contained in said reserve rises along said containment walls by capillary action and is released by them to said soil.

12. The container according to claim 7, wherein said waterproofing covering layer is a unitary, integral and continuous layer completely covering outer lateral surfaces of said containment walls and an outer surface of said bottom.

13. The container according to claim 7, wherein said first porous regions and said second porous region are made of earthenware.

14. The container according to claim 7, wherein said waterproofing covering layer is applied by means of a procedure for waterproofing by immersion or spreading.

15. The container according to claim 7, wherein water released by said walls toward the inside of said container keeps the soil moist for several days, avoiding the need to introduce fresh water in said reserve or to perform periodic watering.

16. A container with diffuse and extended irrigation for cultivating plants, comprising:
a plurality of porous lateral containment walls provided on outer surfaces with a waterproofing layer;
a bottom wall connected to said containment walls; at least one water reserve for supplying said porous regions; and
a removable grille-like partition which divides, into two superimposed chambers, an internal region defined by said containment walls and by said bottom wall, an upper one of said chambers accommodating said soil, a lower one of said chambers containing said water reserve, said grille-like partition being provided on a lower side with a plurality of feet all spaced from all of said containment walls.

17. The container according to claim 16, wherein at least one of said sidewalls is provided with a hole at a level of said partition.

18. The container according to claim 17, wherein said bottom wall and said containment walls are integral and continuous with one another, said waterproofing covering layer completely covering outer lateral surfaces of said containment walls and an outer surface of said bottom.

* * * * *